Jan. 8, 1963 W. L. FIRESTONE 3,072,849
RADIO RECEIVER HAVING VOLTAGE-CONTROLLED RESONANT
CIRCUIT COUPLING MEANS BETWEEN STAGES
Filed Sept. 22, 1960

INVENTOR.
William L. Firestone
BY
Mueller & Aichele
Attys.

United States Patent Office 3,072,849

Patented Jan. 8, 1963

3,072,849

RADIO RECEIVER HAVING VOLTAGE-CONTROLLED RESONANT CIRCUIT COUPLING MEANS BETWEEN STAGES

William L. Firestone, Highland Park, Ill., assignor to Motorola, Inc., Chicago, Ill., a corporation of Illinois Filed Sept. 22, 1960, Ser. No. 57,744
4 Claims. (Cl. 325—319)

This invention relates to radio communication systems, and more particularly to a circuit for controlling the intermodulation of adjacent channel signals in receivers of such systems. It finds particular use in transistorized mobile radio communication receivers, which must often be adapted to receive both weak and strong signals in a spectrum of closely spaced signals, in order to reduce the tendency for intermodulation therein.

It is known in the communication art that a strong received signal often times intermodulates with another signal in certain stages of a radio receiver. Thus, the first tuned stage in a frequency modulation communications receiver may not provide sufficient selectivity to prevent intermodulation at certain levels of signal input and with certain frequency spacing of adjacent channel signals. The problem of such signal interference can become particularly acute in mobile communication systems where a receiver unit may, on some occasions be in strong signal areas, and on other occasions be in weaker signal areas. Some adjustment in the selectivity and sensitivity of the equipment may be desired or even necessary in order to insure proper reception of weaker signals as well as stronger signals under different adjacent channel conditions.

In general, there are two well known types of automatic sensitivity and selectivity control arrangements adapted for use with radio receivers. In one type the gain characteristic of one or more of the electron discharge devices of the receiver, usually an amplifier stage, is regulated. In the other type of transmission of signal energy through the receiver network is regulated by controlling the high frequency coupling between stages in the receiver network. The first type of gain control arrangement, involving the changing of certain of the operating characteristics of the electron discharge devices intended primarily for amplifying purposes, has a number of disadvantages, among which are tendencies to produce even worse intermodulation, cross-modulation and harmonics in the radio frequency amplifier as the overall gain or sensitivity is decreased. This is due to increased non-linearity associated with reduction of gain of an active stage. In transistorized receivers, these effects produced by AGC control of the first type are aggravated, and there is the additional disadvantage of power consumption in the AGC circuit since biasing current is required.

Hence many arrangements of the second type have been proposed for controlling the transfer of radio frequency energy between receiver stages, but these have generally suffered from such defects as complicated, and therefore expensive circuitry, non-linearity, limited range, etc.

Accordingly, it is an object of this invention to provide a simple, efficient and reliable automatic system for controlling the transfer of energy between stages of wave signal translating apparatus to minimize intermodulation therein.

Another object of the invention is to provide improved reception of closely spaced signals of various strengths in a frequency modulation communication receiver.

Still another object is to increase the selectivity and attenuation of a signal tuning circuit in a communication receiver according to the strength of a received signal, for improving the adjacent channel selectivity of the receiver and thereby reducing the tendency for intermodulation interference.

A feature of the invention is the provision of an improved communication receiver in which the transfer of signal energy between stages thereof is regulated by a tunable inductance capacitance network, the impedance of which is automatically controlled by a direct current potential related to the received signal strength to thereby reduce the coupling at high signal levels.

Another feature of the provision of a transistorized receiver with an automatic intermodulation control circuit connected in series between a tuned input circuit and a radio frequency transistor amplifier. The intermodulation control circuit includes a varactor diode (capacitor) which goes into resonance with an inductance coil as a control potential is applied thereto to provide a controllable attenuation to input signals while inversely varying the selectivity of the tuned input circuit.

This invention provides an automatic control system for a communication receiver which automatically reduces the coupling between stages thereof while increasing the selectivity thereof when signals above a certain strength are received. The system includes a variable coupling circuit connected in series between two successive stages of the receiver, the variable circuit being responsive to a control signal for regulating the amount of coupling between the stages. The coupling circuit includes a tunable inductance-capacitance network to which a control voltage is applied to cause a shift in the resonant frequency of the network. In one form, the network utilizes a capacitive element, such as a varactor diode, having a characteristic such that its capacitance varies in accordance with the direct current potential difference thereacross. The control voltage is applied across this capacitive element, causing it to go into resonance with a voltage stable inductive element associated therewith in the coupling network. The resonant frequency of the network is related to the frequency of signals being transferred between stages so that coupling is reduced as the impedance of the resonant circuit increases for the frequency of transferred signals. When the coupling circuit is connected between antenna tuned circuits and a first transistor radio frequency amplifier, the selectivity of the tuned circuits is also increased due to the reduced loading thereof as the impedance of the coupling circuit increases, thereby further reducing the tendency for intermodulation in the receiving equipment. The direct current control potential may be obtained from a stage of the receiver providing rectified signals which vary in accordance with strength of received signals.

Figure 1:
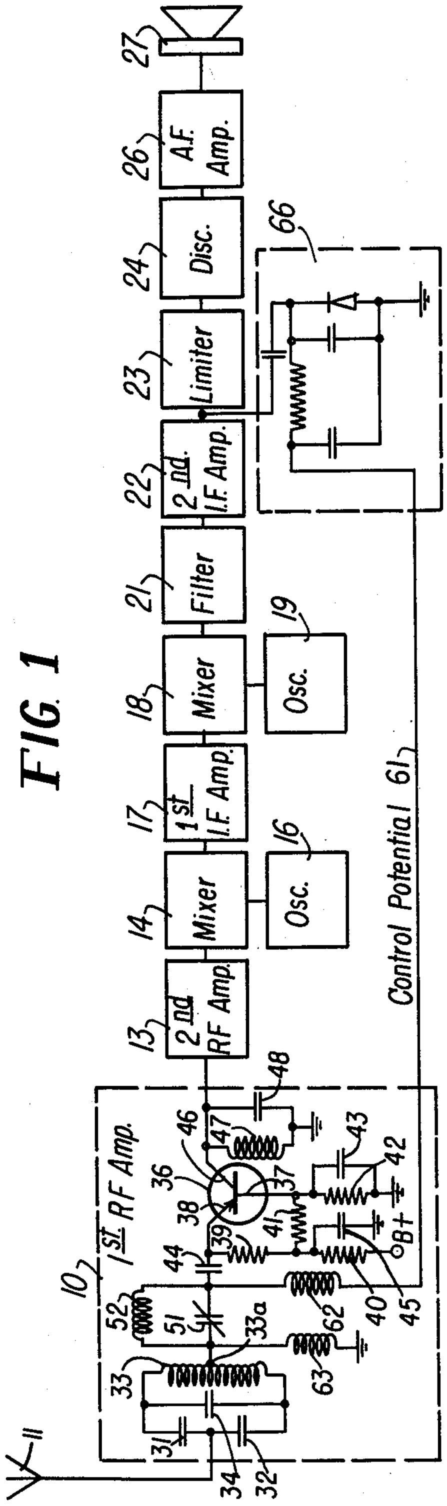
FIG. 1 is a schematic and block diagram of a radio receiver incorporating the invention.

Referring in more detail to FIG. 1 of the accompanying drawing, a mobile communications frequency modulation receiver embodying the invention is shown which includes a first radio frequency transistor amplifier 10 to which the received signal is applied from antenna 11. Amplifier 10 selects and amplifies the received signal which is then applied to a second radio frequency amplifier 13 which may include any desired number of stages. The second radio frequency amplifier 13 is coupled to a mixer circuit 14 where the signal is heterodyned with a signal from a first oscillator 16 and the resultant output applied to an intermediate frequency amplifier 17. A second mixer circuit 18 may be provided for heterodyning the signal with another signal from a second oscillator 19 to produce a still lower intermediate frequency signal which is applied through a passive filter section 21 to second intermediate frequency amplifier 22. Amplifier 22 may include any number of stages, the last one of which feeds a limiter circuit 23. The signal is then applied to a discriminator network 24 where the frequency modulated intelligence is recovered, and after further amplification in an audio amplifier 26, the signal is applied to a loudspeaker 27 or other reproducing device for translating the received signal. The operation of the receiver as briefly described thus far is known in the art and may be seen to be that of a double conversion superheterodyne frequency modulation radio receiver, although the invention may be used in other types of equipment as is apparent from the following description.

Returning to the first radio frequency amplifier 10, the antenna 11 is coupled through capacitor 31 and 32 to a center tap inductance coil 33. A capacitor 34 is shunt connected with elements 31—33 and together therewith comprises a first tuned circuit resonant at the particular carrier frequency of the channel desired to be received. The amplifying element of the radio frequency amplifier stage is a PNP transistor 36 which may be connected with its base 37 as the common or grounded electrode. An emitter electrode 38 serves as the input electrode and is connected to a biasing resistor 39 which in turn is connected through another resistor 40 to a source of direct current labeled B+. Base 37 is connected to the junction of resistors 39 and 40 by a biasing resistor 41, and to ground through a resistor 42 and a bypass capacitor 43 in shunt therewith. An A.C. path for input signals is provided by a blocking capacitor 44 connected to the junction of resistor 39 and emitter 38, and by a radio frequency bypass capacitor 45 connected between resistors 39 and 40 and ground. A collector electrode 46 serves as the output electrode of the transistor 36 and is connected to a tuned output circuit consisting of a coil 47 connected in parallel with a capacitor 48 between collector 46 and ground.

In accordance with the present invention, received signals at the carrier frequency are coupled from tuned circuit 31—34 to the input circuit of transistor 36 by means of a variable coupling circuit. This coupling circuit includes a varactor diode type capacitor 51 connected in series between a center tap 33*a* of coil 33 and blocking capacitor 44. The capacitance of coupling capacitor 51 may be controlled by an applied direct current voltage as is well known in the art, and it may comprise a potential variable condenser such as that sold under the trademark "Varicap." A voltage stable inductance element, such as coil 52, is connected across the terminals of capacitor 51 in parallel therewith. The inductance of coil 52 is selected with respect to the unpolarized capacitance of capacitor 51 such that an inductance-capacitance network is formed which resonates at a frequency differing by a predetermined amount from the carrier frequency.

A control potential for capacitor 51 is applied thereto by means of a lead 61 which is connected through a radio frequency choke 62 to one terminal of capacitor 51. The opposite terminal of capacitor 51 is connected through another radio frequency choke 63 to ground. The control potential is developed in a suitable rectifying network 66 which may be connected before the limiter stage 23 in such a manner as to provide a direct current voltage which varies with the strength of signals received by the receiver.

Figure 2:
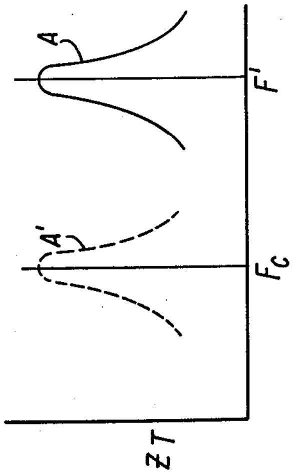
FIG. 2 is a graphical representation helpful in understanding the operation of the invention.

In describing the operation of the circuitry of the invention it will first be assumed that weak signals of a predetermined amplitude are being received by antenna 11. The components of these signals which are coupled at this level from the tuned circuit 31—34 to the coupling network 51—52 are primarily in-channel components, with adjacent channel components being suppressed to sub-audible levels by the normal selectivity of tuned circuit 31—34: For this low signal level, a given direct current control potential is taken from network 66 and applied across the terminals of capacitor 51, thereby establishing a predetermined capacitive reactance across capacitor 51. This capacitive reactance in parallel with the inductance of coil 52 causes the coupling network 51—52 to resonate at a frequency F′ which differs by a predetermined amount from the channel frequency $F_c$. Curve A of FIG. 2 illustrates the impedance characteristic of the circuit 51—52 for this predetermined weak signal for the frequencies $F_c$ and F′. The in-channel signal is then developed principally across the input impedance of radio frequency amplifier 10 consisting of capacitor 44, resistor 39 and capacitor 45.

When the received signal level rises above the predetermined low level, the control potential applied across capacitor 51 varies accordingly to thereby change the capacitance of capacitor 51. By matching the control potential variation to a varactor diode selected to have the proper characteristics to serve as capacitor 51, the resonant frequency of the coupling network 51—52 may be made to shift towards the channel frequency of $F_c$. The values may be selected such that at maximum signal levels the impedance characteristic of network 51—52 is represented by dash curve A′, which would then be centered on the channel frequency $F_c$. It will thus be seen that as the signal level rises the impedance offered by the network 51—52 to the received signals increases, the network thus forming a trap circuit offering a large attenuation to all in-channel signals and thereby preventing a further increase in intermodulation, resulting in overall intermodulation decrease for strong signals. The breadth of the impedance curve may be designed to attenuate adjacent and alternate channel signals as well as on-channel signals. The coupling trap circuit is operable over a large dynamic impedance range and therefore provides a wide range of attenuation control.

The invention also operates to increase the selectivity of the receiver as its sensitivity is decreased. Since the coupling network 51—52 is in series with the input circuit of transistor 36, a voltage divider network is formed with the coupling network portion thereof having a regulated impedance. For weak signals the impedance of the coupling network is at a minimum, and the coupling between the tuned circuit 31—34 and the impedance presented by the input circuit of transistor 36 is set for critical coupling, e.g. maximum loading of the tuned circuit consistent with bandwidth limitations. Increasing the impedance of the coupling network 51—52 to signals of channel frequency $F_c$ also increases the total impedance presented to the tuned circuit 31—34, thereby decreasing the load coupled to the tuned circuit. This reduction in the load coupled to tuned circuit 31—34 increases the Q thereof and decreases the pass band thereof. Thus the decoupling action of the L-C trap circuit 51—52 when it is associated with a preceding tuned circuit increases the selectivity of the receiver.

It will be understood that, in place of the rectifier circuit 66, any suitable source of direct current control potential which varies with the amplitude of the received signal may be used as a source for the control potential. The correct polarity for capacitor 51 may be easily provided by connecting lead 61 to the appropriate terminal thereof.

Figure 3:
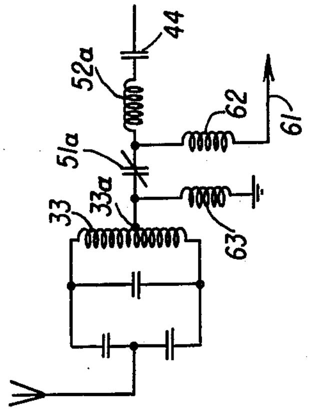
FIG. 3 is a diagram of a modified circuit of the invention.

The variable coupling network may also be provided in the form of a series resonant circuit as shown in FIG. 3. In this form, coil 52*a* is connected in series with capacitor 51*a* between center tap 33*a* and blocking capacitor 44. The control potential may be applied across the terminals of capacitor 51*a*. However, the values of inductance and capacitance are here chosen so that the trap circuit resonates at the frequency $F_c$ for a minimum received signal level. An increase in signal level is reflected in the control potential to drive the series trap circuit off resonance from frequency $F_c$, or in other words, shifts its resonant frequency by a predetermined amount. Hence, the impedance of the series trap circuit is increased at the receiver tuned frequency, $F_c$, as the signal level increases. The regulation is between minimum and maximum values in the manner of the parallel trap circuit to provide automatic attenuation at strong signal levels.

It is evident that the invention provides a simple and economical system for automatically reducing the tendency for intermodulation of signals in a communication receiver. The system provides automatic response to signals of increased strength so that the signals are attenuated between stages of the receiver without varying the gain of the stages. The system operates linearly with signal variations. Moreover, the coupling device of the invention when associated with tuned circuits increases the selectivity of the receiver at an operating point where this characteristic is most needed. Accordingly, it is possible to improve the reception of signals of various strengths which may be closely spaced in frequency. In transistorized receivers, the coupling device is particularly advantageous when used in lieu of conventional automatic gain control circuits since almost no power is needed to provide the attenuation effect compared to that drawn when transistors are current biased for the A.G.C.

It will be understood that it is intended to cover all changes and modifications of the examples of the invention herein chosen for the purpose of illustration which do not constitute departures from the spirit and scope of the invention. For instance, a similar result is obtainable by reversing the potential variable elements such that the inductive branch of the coupling network varies with the control potential while the capacitive branch remains insensitive to the control voltage.

I claim:

1. A wave signal intermodulation attenuation system for a receiver, including in combination, first and second receiver circuit portions having output and input circuits respectively, said first receiver circuit portion having a tuned circuit tuned to the desired signal, resonant circuit means connected in series between said output and input circuits and being the sole intercoupling between said receiver circuit portions, said resonant circuit means including inductance means and potential variable capacitance means and having values of inductance and capacitance respectively so as to provide low impedance at the frequency of signals coupled between said receiver circuit portions, means for applying a direct current potential across said potential variable capacitance means which potential is proportional to the level of a signal translated by said system, said resonant circuit means providing a higher impedance between said output and input circuits as said direct current potential varies with increasing signal level and said resonant circuit means is variably resonate with respect to the frequency of the desired signal to thereby reduce overall intermodulation effects for strong received signals.

2. A wave signal input system for coupling an antenna to a receiver including in combination, a tuned circuit coupled to said antenna for selecting signals of a channel frequency and having an output terminal, a radio frequency transistor amplifier stage having an input circuit for applying received signals thereto, potential variable capacitor means connected in series between said output terminal of said tuned circuit and said input circuit of said transistor amplifier stage, a source of direct current potential directly related to the strength of signals translated by said system, means for applying the direct current potential across said capacitor means for varying the capacitance thereof in relation to the strength of signals translated by said system, inductance means connected in parallel with said capacitor means and having a value of inductance selected to resonate therewith at a frequency differing by a predetermined amount from said channel frequency when the direct current potential across said capacitor is below a given value, whereby said capacitor means being resonated with said inductance means at said channel frequency as the strength of signals being received by said receiver on said channel frequency increases to increase the impedance between said tuned circuit and said input circuit of said transistor amplifier stage and the selectivity of said tuned circuit.

3. A wave signal input system for coupling an antenna to a receiver including in combination, a tuned circuit adapted to be coupled directly to the antenna for selecting signals of a channel frequency, a first transistor amplifier stage having an input circuit for applying received signals thereto, a varactor diode and an inductor connected as a series resonant circuit between said tuned circuit and said input circuit, a source of direct current potential variable in direct proportion to the strength of signals translated by said system, means for applying the direct current potential across said diode for varying the capacitance thereof with respect to the strength of signals translated by said system, said varactor diode and said inductor having respective values selected to resonate at substantially the channel frequency to offer low impedance to signals of channel frequency when the control potential across said diode is below a given value and to resonate at a substantially different frequency to offer higher impedance to signals of channel frequency as the direct current potential applied to said diode is increased.

4. A wave signal input system for coupling an antenna to a receiver including in combination, a tuned circuit coupled to the antenna for selecting signals of a channel frequency, a radio frequency transistor amplifier stage having an input circuit for supplying received signals thereto, a resonant circuit connected in series between said tuned circuit and said input circuit, said resonant circuit including a variable reactive element responsive to a changing potential thereacross to change the reactance thereof, a source of direct current potential directly related to the strength of a selected signal translated by said system, means for applying the direct current potential across said reactive element for varying the same in relation to the strength of the signal translated by said system, the values of said resonant circuit being chosen with respect to the values of the direct current potential to provide high signal transfer between said tuned circuit and said amplifier stage at low signal levels and to provide low signal transfer between said tuned circuit and said amplifier stage at high signal level with reduced loading and increased selectivity of said tuned circuit.

References Cited in the file of this patent

UNITED STATES PATENTS

| | | |
|---|---|---|
| 2,875,414 | Wlasuk | Feb. 24, 1959 |
| 2,882,350 | Stern et al. | Apr. 14, 1959 |
| 2,936,428 | Schweitzer | May 10, 1960 |
| 2,947,859 | MacDonald | Aug. 2, 1960 |
| 2,967,236 | Freedman | Jan. 3, 1961 |